Oct. 18, 1966  A. L. COULTER  3,279,748
TOGGLE ACTION VALVE
Filed March 24, 1964  2 Sheets-Sheet 1
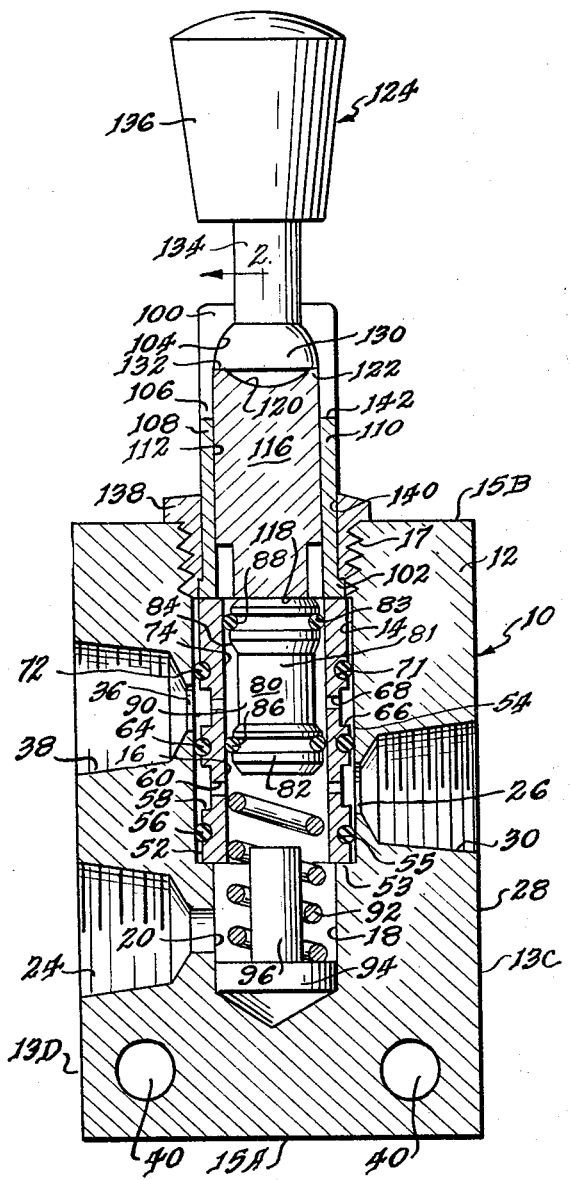
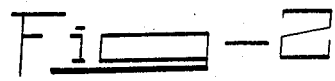
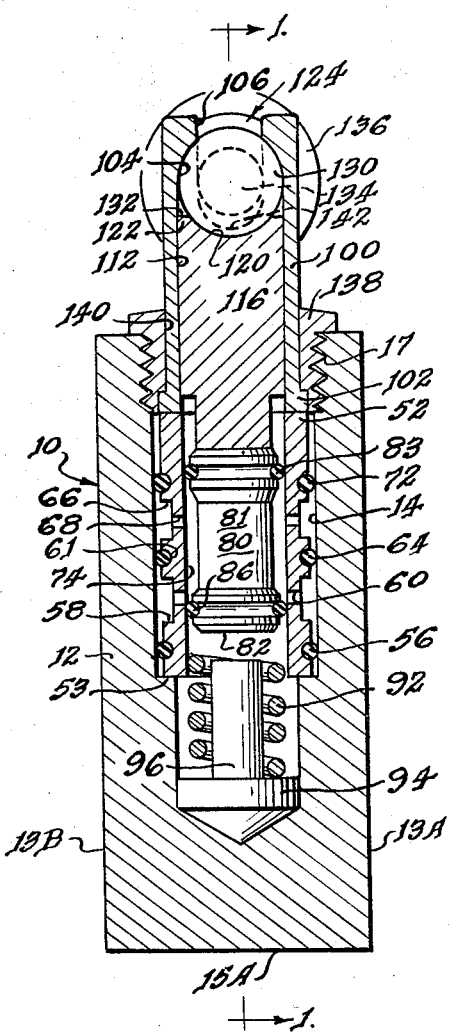
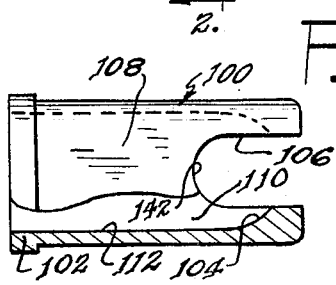
Inventor
Albert L. Coulter
Stone, Nierman,
Burmeister & Zummer
Attorneys Oct. 18, 1966 A. L. COULTER 3,279,748
TOGGLE ACTION VALVE
Filed March 24, 1964 2 Sheets-Sheet 2
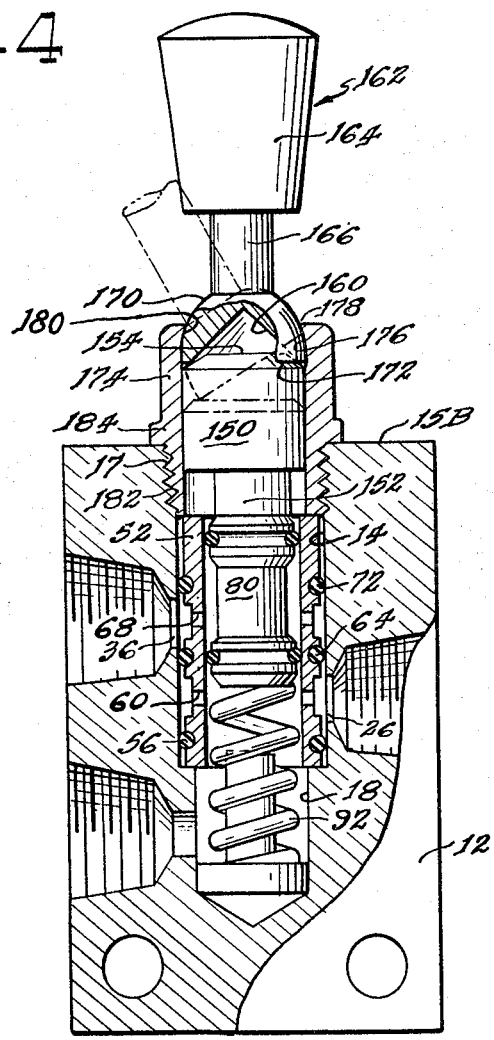
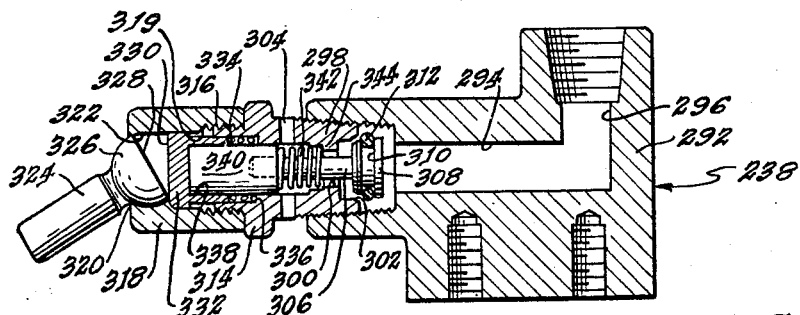
Inventor
By Albert L. Coulter
Stone, Nierman,
Burmeister & Jummer
Attorneys

United States Patent Office 3,279,748
Patented Oct. 18, 1966

3,279,748
TOGGLE ACTION VALVE
Albert L. Coulter, McHenry, Ill.
(Commercial Road, P.O. Box 436, Crystal Lake, Ill.)
Filed Mar. 24, 1964, Ser. No. 354,336
4 Claims. (Cl. 251—263)

The present invention relates to valves and more particularly to valves of the type which utilize a toggle action to actuate the valve.

One of the objects of the present invention is to provide a novel toggle action valve with an actuation member which may be actuated from any direction with a component normal to its axis of rest.

It is a further object of the invention to provide such a toggle action valve which will lock in the operated position until released.

It is a still further object of the invention to provide a novel and improved valve structure suitable for use with a toggle actuator, the basic valve elements of the valve structure being suitable for use with different handle and handle mounting elements to produce toggle valves of locking or non-locking types.

These and further objects and advantages of the present invention will become readily apparent to those skilled in this art from a consideration of the following specification, particularly when viewed in the light of the drawings, in which:

FIGURE 1 is a sectional view of a valve in an unactuated position constructed according to the present invention and constituting a first embodiment of the invention;

FIGURE 2 is a sectional view taken along the line 2—2 of the valve of FIGURE 1, with the valve in its actuated or locked position;

FIGURE 3 is a side elevational view of the end cap illustrated in the valve of FIGURES 1 and 2;

FIGURE 4 is a side elevational view of a valve partially broken away and in section showing a second embodiment of the invention; and FIGURE 5 is a sectional view of a valve constituting a third embodiment of the present invention.

FIGURES 1 through 3 illustrate a locking toggle valve 10 with a body 12 in the form of a solid right rectangular prism fabricated suitably of metal, plastic or the like. The body 12 has side walls 13A, 13B, 13C and 13D, and ends 15A and 15B. Within the body 12 there is provided a cylindrical bore 14 through one end wall 15B of the body and extending centrally through the body length for a great portion of its length dimension. The bore 14 at its innermost end has a coaxially disposed portion 18 of lesser diameter than the mid-portion 16 of the bore 14. At its outer end adjacent to wall 15B, the bore 14 has suitable internal threads 17.

At the smaller diameter inner end portion 18 of the bore 14, a cylindrical passage 20 extends normally to the bore axis and opens into the bore 14. This passage extends through to side wall 13D of the body and the mouth of the passage 20 is internally threaded at 24 to accept a threaded connector. Axially spaced from the passage 20 is a second passage 26 which is disposed in the wall 13C on the opposite side of the bore 14 from passage 20, and the passage 26 is axially spaced from the passage 20 toward the wall 15B. Passage 26 is also normal to the axis of the bore 14, extends into the bore at the bore mid-portion 16, and is internally threaded at its mouth 30 disposed in the wall 13C, to receive a connector.

A third passage 36 also extends from the bore 14 between the second passage 26 and the end wall 15B. Passage 36 extends through end wall 13D parallel to passage 20 and is also threaded at its mouth 38 to accept a connector.

Adjacent the wall 15A of the block 12, there are provided a plurality of mounting holes 40 extending through the entire block 12 between the opposed parallel walls 13A and 13B.

As mentioned previously, bore 14 is cylindrical, has a smaller diameter inner end 18, a threaded mouth 17 and an intermediate portion 16 with a smooth cylindrical sidewall. A tubular sleeve 52 is disposed within portion 16 of the bore 14 and has an outer surface 54 which has a diameter slightly less than the diameter of the interior surface of section 16 of the bore 14, and the sleeve 52 abuts a circular shoulder 53 between the section 16 and end portion 18 of the bore 14. The sleeve 52 has a continuous coaxial circular groove 55 disposed adjacent to the shoulder 53 and an elastomer O-ring 56 is disposed within the groove 55 and serves to seal the area between the outer perimeter of the sleeve 52 and the adjacent side wall at the mid-section 16 of the bore 14. In the same plane as passage 26, the exterior surface of the tubular sleeve 52 has an annular groove 58, rectangular in section.

The tubular sleeve 52 has a plurality of radial ports 60 extending from the groove 58 through the sleeve in a plane normal to the axis of the sleeve 52.

Further, along the sleeve 52 is a second circular groove 61 in the exterior surface of the sleeve 52 and a second elastomer O-ring 64 is disposed, in this groove 61 in sealing relation with the sidewall of the bore mid-section 16. This O-ring 64 is spaced along the sleeve 52 on the side of passage 26 opposite to that on which O-ring 56 is positioned. Further, a second annular groove 66 is disposed in the exterior surface of the sleeve 52 adjacent to the passage 36. A plurality of spaced radial ports 68 extend through the sleeve 52 from the groove 66. Outwardly along the sleeve outer perimeter is a third annular grove 71 which bears an O-ring 72 for sealing the area between the sleeve outer periphery and the adjacent bore wall, axially outward of the opening 36 and the series of ports 68. The sleeve 52 is secured in position within the bore 14 and remains stationary in the bore.

The inner channel of sleeve 52 is cylindrical and designated by the reference numeral 74. A spool 80 is translatably disposed within the channel 74 and sealed thereto. The spool 80 comprises a solid member 81 which is provided at its axial ends with cylindrical coaxial protrusions 82 and 84. The protrusions 82 and 84 are spaced apart axially by a distance greater than the axial distance between the two sets of ports 60 and 68 in the sleeve 52. Each of these protrusions has a suitable annular groove 83 for receiving and holding an elastometer O-ring, the first of said O-rings 86 encircling protrusion 82 and the second O-ring 88 encircling protrusion 84. These O-rings contact the adjacent inner channel 74 between the spaced protrusions of sleeve 52 and seal therewith providing a cylindrical translatable cavity. The spool 80 has an outer periphery 90 of smaller diameter than the diameter of the spool at the protrusions 82 and 84.

The spool at its outer end terminates at approximately the juncture of the mid-section 16 of the bore 14 and the threaded portion 17 thereof. A helical compression spring 92 extends axially from the inner termination of the bore 14 at the reduced diameter section 18 to abut the confronting end of the spool 80 and urge the spool 80 outwardly from the bore 14. To properly center the spring 92, there is provided a spring guide 94 which bottoms on the inner end of bore 14 and has a central shaft 96 fitted into the open center of the helix of spring 92.

Within bore 14 outwardly of the sleeve 52 and spool 80 is fitted a tubular cap member 100 which is of approximately the same diameter as the sleeve and may be of comparatively thin cross section. At its lower or innermost end in the assembly, cap 100 has a continuous ridge 102 extending radially outwardly about the outer periphery of the cap 100. The cap is open at its bottom and at its upper end has an internal socket 104 which is partially spherical with its center on the axis of the bore and also on the axis of the cap member 100. This socket is open axially along the outer end of the cap as indicated by the aperture 106 which is generally slotted and extends for a distance from the outer end of the cap on opposed cap sides 108 and 110.

Cap member 100 is of approximately the same outer diameter as sleeve 52, and therefore fits into bore 14 at the threaded end 17 and extends from the wall 15B of the body 12. The interior of the cap member 100 is a cylindrical bore 112 and a shaft 116 is translatably disposed therein. The innermost end 118 of the shaft 116 abuts the outer end of spool 80 at the protrusion 84. This shaft is freely translatable within bore 112 of cap 100 and at its outer end has a part cylindrical concavity 120 centered on the common axis of bore 14 and cap 100. A handle 124 abuts against the circular rim 122 formed by the edge of concavity 120. The handle 124 includes at its inner end a part spherical ball 130 which mates and is confined within the partially spherical socket 104 at the outer end of the cap 100. This part spherical ball ends in a flat surface or shoulder 132 which in one valve position rests on the rim edge 122 of the shaft 116. Extending concentrically from the ball 130 is a handle shaft 134 of small enough diameter to ride smoothly within the slot 106. At the outermost end of the handle is an enlarged knob 136 which is used to allow the handle 124 to be grasped and rotated. As mentioned, the handle 124 is confined within the cap 100 by the mating engagement of the ball 130 in the socket 104.

The cap 100 is confined within the bore 14 of the body 12 at its threaded end 17 by a gland nut 138 which screws into the bore and which at its lead end engages the peripheral ridge 102 at the cap inner end to keep the cap member and also the sleeve member from axial movement. The fit of the cap member within the gland nut 138 opening 140 and the engagement of the gland nut 138 and ridge 102 are free enough to allow the cap to be rotated within the bore for purposes which will be explained more fully.

From this description, it can be seen that the valve may be readily assembled within the bore 14 and may readily be replaced or interchanged if necessary. With the construction set out, compression spring 92 maintains the spool 80 and the shaft 116 at the extreme outer position which maintains the ball 130 of the handle firmly within the socket 104 in the position shown best in FIGURE 1.

When the valve is in the position shown in FIGURE 1, the normal position of the valve, passage 20 is in communication with opening 30 through the bore 14. This path may be followed from passage 20, through the smaller diameter portion 18 of the bore 14 into the intermediate section 16 of bore 14 and through ports 60 and groove 58 to passage 26. The O-rings 56 and 64 on the outside of the sleeve 52 seal the sleeve against the bore 14. Further, the protrusion 82 of the spool 80 is sealed by O-ring 86 to the inner channel 74 of the sleeve 52.

To operate the valve, handle 124 is pivoted so that handle shaft 134 pivots within the slot 106 to an over center position in which the handle shaft abuts against the axial edge 142 of the slot 106. This movement of the handle shaft rotates the part spherical ball 130 within the socket 104, thus rotating the shoulder 132 to a position beyond the axis of the bore 14, as illustrated in FIGURE 2. In this position, the rim of the shoulder 132 has moved inwardly from the position of FIGURE 1, thereby pushing on concavity 120 of shaft 116 and causing the shaft to be translated inwardly to the position of FIGURE 2 against the bias of compression spring 92. This movement of shaft 116 translates spool 80 inwardly to a position in which the protrusion 82 of the spool 80 is in the axial space between passage 20 and passage 26. The protrusion 84 remains in a position outwardly in the axial direction of the ports 68 to seal the flow of fluid within the channel 74 from the handle 124. With the spool 80 in this position, flow from passage 20 is blocked, and a flow path is open from passage 26 through the groove 58 and ports 60, through the channel 74 in the sleeve 52 to the ports 68, the groove 66, and out through passage 36.

The valve is maintained in the actuated position by the over-center positioning of the handle shaft 134. The part spherical ball 130 is wedged in its position of maximum cross section between the seat 104 and the concavity 120, and is in a stable position. When the valve is to be returned to the unoperated state, the handle shaft 134 is restored to the position of FIGURE 1 and the compression spring 92 restores the spool 80 to its normal position.

It should be noted that cap 100 is freely rotatable within the bland nut 138 so that the position of slot 106 may be set as desired. By this rotatable movement of the cap 100, the handle shaft 134 may be operated from any angular position and locked in that position by tightening the bland nut 138.

In the embodiment of the invention shown in FIGURE 4, the valve construction is identical to the embodiment of FIGURES 1 and 2, and the same reference numerals are used for identical ports. The embodiment of FIGURE 4 differs, however, in the actuation mechanism and is a non-locking valve whereas the valve of FIGURES 1 and 2 lock in either of two positions.

The construction of body 12, with its passages leading into the central bore 14 is identical to that previously described. Sleeve 52 with its O-rings and ports is also identical to that of the first embodiment, as is spool 80 with its flared sections 82 and 84 with their respective O-rings 86 and 88. In this embodiment, there is provided a shaft 150 with an inner end 152 which abuts against the outer end of the spool 80 and extends axially within bore 14 and past the upper wall 15B of block 10. The outermost end 154 of the shaft is crowned or chamfered, the crowned end 154 is dimensioned to fit within a concentric, conical indentation 160 at the inner end of handle 162. Handle 162 has a knob 164 at its outer end and a handle shaft 166 leading from the knob into a spherical ball segment 170 with an inner concentric rim 172 at its spherical end. This rim 172 surrounds the conical indentation 160.

The ball fits matingly within a cap member 174 which has a socket 176 for receiving the ball and an axial opening 178 through which the ball protrudes outwardly. The cap member 174 adjacent the opening has a shoulder 180 which confines the ball therein. The cap member 174 is externally threaded at 182 to fit into the threaded extremity 17 of bore 14 to hold the handle and spool in place, the threaded portion 182 terminating at a shoulder 184 which limits the amount of ingress of the cap member into the bore 14. In all other respects the device of FIGURE 4 is identical to valve 10.

In the normal or unoperated position, the functioning of the valve is the same as that of the first embodiment previously described. To operate the valve, knob is pivoted from any direction whatever. Pivoting of the handle pivots ball segment within the socket as in the prior embodiment, and the inner shoulder of the ball segment describes an inward movement and translates the shaft inwardly to translate the spool. Translation of the spool places ports 60 and 68 in communication and therethrough the passages 26 and 36 are placed in communication to establish a path for fluid from one passage to the other. This valve is non-locking and whenever the manual pivoting force on the handle is released, the compression spring 92 translates the spool 80 and the shaft 150 outwardly to restore the handle to its normal or unoperated position through the interaction of the crowned end of the shaft and the conical opening in the base of the ball.

In order for the valve of FIGURE 4 to be non-locking, the handle must not pivot through a sufficient angle to align the rim 172 with the axis of the bore 14. In the embodiment of FIGURE 4, the socket 176 abuts the handle shaft 166 to limit angular deflection of the handle shaft 166 to angles insufficient to cause the rim 172 to cross the axis of the bore 14. In the embodiment of FIGURES 1 through 3, the rim 132 of the ball segment does cross the axis of the bore on actuation assume a locked position.

In the embodiment of FIGURE 4, pivoting of the handle 162 not only causes the rim 172 to move axially, thereby translating the spool 80, but also causes the rim to move axially inward to engage the incline plane of the chamfered end 154 of the shaft 150, thus further translating the spool. In this manner, translation of the spool to a limited angular deflection of the handle 162 is optimized and made essentially immediate.

With the construction set out in FIGURE 4, handle 162 may be pivoted from any direction. The valve once operated, restores when the manual force is released from the handle and the valve resumes its normal or unoperated state.

FIGURE 5 illustrates the details of the valve 238 employing a third embodiment of the invention. The valve 238 has a valve block 292 which is provided with a first bore 294 extending therein and a second bore 296 normal to the first bore. The mouth of the first bore 294 is threaded with pipe threads, and a plug 298 has pipe threads engaging the threads of the mouth of the first bore 294. The plug 298 has an axial bore 300 which extends therethrough and flares outwardly at its inner end 302 to form a valve seat. A second bore 304 extends into the axial bore 300 normally to form an outlet to the ambient atmosphere. A pin 306 is slidably disposed within the first bore 300, and the pin 306 has an outwardly flaring head 308 provided with a circular groove 310 extending coaxially about the pin 306 which accommodates an O-ring 312. The O-ring 312 is adapted to seat against the outwardly flaring seat 302 of the plug 298.

The plug 298 has a flange 314 which is adapted to engage a wrench for purposes of tightening the plug within the bore 294. The plug 298 also has a tubular threaded portion 316 extending coaxially on the side of the flange 314 opposite the block 292, and a cap 318 has a cylindrical cavity 319 which threadedly engages this tubular threaded portion 316. The cap 318 is provided with a circular opening 320 coaxial with the tubular portion 316 at its end opposite the flange 314, and the opening 320 to the cavity 319. A lever 324 with a semi-spherical end 326 extends from the opening 320, the partial-spherical or truncated end being disposed within the cap 318 in abutment with the part-spherical surface 322. The lever 324 terminates in a flat surface 328 adjacent to the partial-spherical surface 326, and this flat surface abuts the flat surface 330 of a plug 332. The plug 332 is slidably disposed within the cavity 319 of the cap 318, and is spring biased outwardly by a helical spring 334 disposed between the end of the cap opposite the lever 324 and a shoulder 336 in the bore 330. The plug 332 has a cylindrical recess 338 extending therein from the side opposite the flat surface 330, and a cylindrical stub 340 is disposed within this recess 338. The pin 306 is mounted on the stub 340 and extends from the end thereof opposite the plug 332, and a spring 342 is mounted between the stub 340 and a second shoulder 344 in the bore 300. In this manner, the spring 342 spring biases the O-ring 312 into abutment with the seat 302, and the lever 324 must be rotated to the position indicated in FIGURE 5 to force the O-ring away from the seat 302 and permit fluid to flow through the bores 294, 296, 300, and 304. The lever 324 may, however, be rotated in any direction to actuate the valve.

Those skilled in the art will readily devise many different embodiments and applications within the scope of the present invention. It is therefore intended that the scope of the present invention be not limited to the foregoing disclosure, but be limited only by the appended claims.

What is claimed is:

1. A toggle valve mechanism including a body structure, a bore extending into said body from one end thereof, a first radial passage entering into said bore along the cylindrical side wall of the bore, a second passage entering said bore through said side wall at a location axially spaced from said first passage, a tubular sleeve fitted within said bore with the outer surface of said sleeve closely adjacent the bore side wall, a plurality of spaced O-rings about the outer surface of said sleeve, said O-rings being axially spaced from one another and confining each of said passages between adjacent O-rings, annular channels in the outer surface of said sleeve adjacent each of said passages, ports extending through the sleeve in each of said channels to form paths for the flow of fluid from said passages to the sleeve interior, a cylindrical spool member coaxially disposed in said sleeve interior, flared annular sections on said spool member spaced apart an axial distance greater than the distance between adjacent passages, O-rings on said flared sections, said O-rings contacting the inner surface of said sleeve to prevent the flow of fluid through said sleeve past said flared section O-rings, a helical compression spring biasing said spool member to a first position in which one of said flared sections is disposed axially between said passages to prevent the flow of fluid between the passages, means for translating said spool member along the axis of said bore from said first position, said translating means comprising a shaft axially movable within said bore, said shaft having one end in engagement with said spool member and another end extending out of the body, an elongated handle in contact with said shaft other end, said handle normally assuming a position coaxial to said bore, said one handle end comprising a partial spherical ball with a flat surface normal to the axis of the handle resting on said shaft and forming a circular rim at the periphery of the flat surface, a cap fitted into said body to cover the one end thereof, said cap including at its outer end an inwardly open partial-spherical socket for matingly receiving said ball, an opening at the end of said cap through which said handle protrudes to allow said handle to be manipulated from the exterior of said body, said cap having a slot extending therein from the opening thereof, said slot permitting rotation of the handle to an obtuse angle with respect to the axis of the bore of the body, thereby locking the handle into position, said handle being manipulatable from said axial position to an operated position wherein said handle is moved to a position radial to said bore to rotate said ball within said socket, a portion of the rim at the edge of said ball surface being axially displaced by said handle manipulation to thereby translate said shaft within said bore to an operated position, said shaft on translation to said operated position acting on said spool to translate said spool within said bore to an operated position with said spool O-rings disposed axially outwardly of said passages whereby to create a path for the flow of liquid between said passages through said sleeve ports and said sleeve interior.

2. A mechanism as claimed in claim 1, in which the other end of said shaft includes a part spherical concavity of smaller diameter than the ball and with a radius of curvature approximately equal to the radius of the ball, said ball shoulder being movable within said concavity on movement of said handle to translate said shaft against the bias imposed by the compression spring on said spool and the shaft toward said operated position, and in which said cap is rotatable about the bore axis to allow said handle to be manipulated from any radial angular position.

3. A toggle action valve comprising a valve body having a cylindrical bore extending therein from a mouth, a first opening in said body extending radially into said bore, a second opening in said body axially displaced from said first opening, a spool translatably disposed within said bore, said spool having a circular flange sealed to the bore adapted to prevent passage of fluid from said first to said second opening, spring bias means disposed in the valve body engaging the spool and urging the spool toward the mouth of the valve body, a toggle handle structure mounted on the body confronting the bore opening, said handle structure including a spherical ball segment having a circular rim at one side and a radially disposed shaft extending normally from the circular rim, a socket mounted on the body confining said ball segment with its center on the axis of the bore having an opening aligned with the axis of the bore and extending about the shaft, the opening in the socket being in the form of a slot and extending along the socket for a distance to allow the toggle handle to be moved from said axial position to a second position at an obtuse angle from said first position whereby the handle is locked in said second position, said socket having an elongated channel aligned with the bore and extending between the opening and the mouth of the bore, said spool having an elongated drive member translatably disposed within the elongated channel of the socket and having a surface confronting the one side of the ball segment, and the one side of the ball segment being in abutment with the confronting surface of the drive member, rotation of said ball segment on angular movement of the handle from its axial position moving a portion of the rim of the ball segment closer to the mouth of said bore and said portion of the rim translating said spool inwardly on said movement of said handle to a position changing the operative condition of the valve.

4. A toggle action valve as claimed in claim 3, in which said slot is rotatable about the axis of said bore allowing said handle movement to be effected to radially position about the bore axis.

References Cited by the Examiner
UNITED STATES PATENTS

| | | | |
|---|---|---|---|
| 1,556,442 | 10/1925 | Holcomb et al. | 251—40 X |
| 2,646,248 | 7/1953 | Cornelius | 251—263 |
| 2,910,081 | 10/1959 | Karbowniczek | 251—324 X |
| 3,152,614 | 10/1964 | Carls | 137—625.69 |

M. CARY NELSON, *Primary Examiner.*

MARTIN P. SCHWADRON, *Examiner.*